(No Model.)

A. HAHN.
MOLD FOR MAKING TUBULAR BRICKS.

No. 255,972. Patented Apr. 4, 1882.

Witnesses
L. C. Fitler
Geo. A. Bauer

Inventor
Adam Hahn
by his attys
Bakewell & Kerr

UNITED STATES PATENT OFFICE.

ADAM HAHN, OF KEYSTONE JUNCTION, PENNSYLVANIA, ASSIGNOR OF ONE-HALF TO JAMES JACOB HOBLITZELL, OF SAME PLACE.

MOLD FOR MAKING TUBULAR BRICKS.

SPECIFICATION forming part of Letters Patent No. 255,972, dated April 4, 1882.

Application filed December 5, 1881. (No model.)

*To all whom it may concern:*

Be it known that I, ADAM HAHN, of Keystone Junction, in the county of Somerset and State of Pennsylvania, have invented a new and useful Improvement in Molds for Making Tubular Bricks; and I do hereby declare the following to be a full, clear, and exact description thereof.

My invention consists in an improved mold for making tubular bricks for blast-stoves and hot-air conduits generally.

The difficulty heretofore experienced with such molds has been that, the core being solid and with a blunt upper end, the plastic material caught thereon and was difficult to get down into the cavity of the mold, and this made the operation very slow. Another difficulty was that the bricks, when formed, stuck in the mold and could not be easily removed. By my improvement these difficulties are both obviated, the material can be "slapped" down into the mold in the usual way practiced in making bricks by hand, filling the mold perfectly, and when the brick is formed it can be instantly emptied therefrom by simply inverting the mold on the table or carrying-board.

To enable others skilled in the art to make and use my improved mold, I will now describe it by reference to the accompanying drawings, in which—

Figure 1:
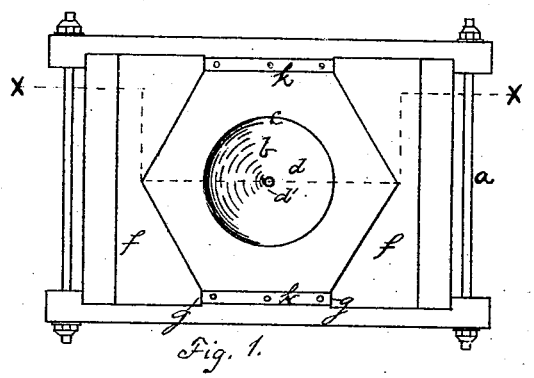
Figure 3:
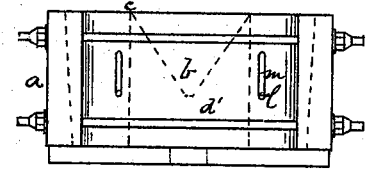
Figure 2:
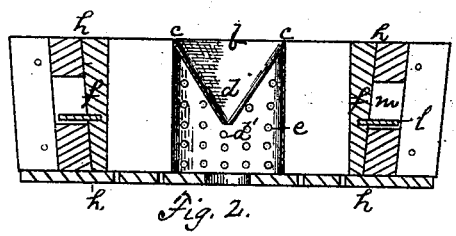
Figure 4:
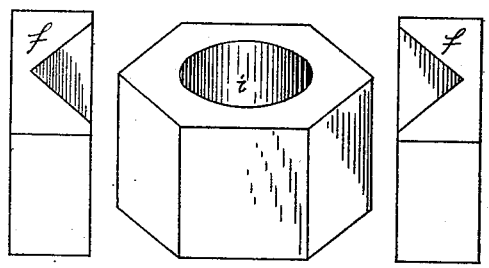

Figure 1 is a plan view of my improved mold. Fig. 2 is a longitudinal section of the same on the line $x\ x$. Fig. 3 is an end view; and Fig. 4 is a perspective view of the brick and movable parts of the mold, and illustrates the manner of removing the brick from the mold.

Like letters of reference indicate like parts.

The mold $a$ is preferably a wooden box of rectangular form. It has a hollow central core, $b$, having a sharp upper edge, $c$, and a cavity, $d$, which opens clear through, as at $d'$, for the escape of the air therefrom when the plastic material descends in it. The sides of the core are perforated, as at $e$, to prevent the material sticking to it when the brick is turned out. The central core, $b$, does not extend above the upper face of the mold, in order that it may not interfere with cutting off the surplus material, and that it may not strike the table or carrying-board when the brick is turned out.

In the ends of the mold are sliding or removable pieces $f$, which fit in recesses or dovetails $g$, and are retained in place thereby. These pieces $f$ constitute the end molding-faces, and preferably the greater part of the surface that forms the exterior of the brick. In the instance shown—i. e., a hexagonal brick—they form four of the six sides. The external surface of the core $b$ is slightly tapered, as also are the outer sides of the pieces $f$, to give sufficient draft to permit the easy discharge of the brick. This is shown in the section, Fig. 2, the draft of the pieces $f$ being on the lines $h\ h$. The instance shown is a hexagonal brick for use in the construction of the hot-air flues of a Siemens-Cowper-Cochrane hot-blast stove. The mold is six inches deep and the draft is five-eighths of an inch. In this case the central opening, $i$, is round and the external shape is hexagon. I do not, however, limit myself to that or any other shape of tubular brick, as I can make bricks having a central opening of polygonal, oval, or other shape and an external form of round, oval, square, or any polygonal shape.

The bottom of the mold-cavity should be vented to permit the escape of air when the material is cast therein.

In use, when making bricks by hand, the material is slapped in and the surplus is cut off by a string, all in the usual way. The mold is then inverted on the table or carrying-board, and the brick, with the adhering end pieces, $f$, drops out, and then the end pieces are drawn off of the brick, all as shown in Fig. 4. I am enabled to effect the easy removal of the brick by reason of the dropping out of the end pieces, $f$, to which it adheres. It parts freely from the fixed sides $k$ and the central core, $b$. The sharp edge $c$ of the core cuts the clay as it goes into the mold, and thereby enables it to pass down into the mold-cavity, instead of, as heretofore, being stopped by the blunt upper end of the core.

This mold may be used in the manufacture of pressed bricks.

The bricks are designed for use in the construction of conduits, especially for the conduction of hot air and similar gases.

If desired, the mold may have more than one hollow core, and also all the molding sides removable; also, the movable side or end pieces, f, may be retained in their places by means of the pins l, extending into the slots m, Figs. 2 and 3, which permit a limited discharging movement of the movable pieces.

What I claim as my invention, and desire to secure by Letters Patent, is—

1. A mold for forming tubular bricks, having a hollow core or cores provided with an upper cutting-edge, substantially as and for the purposes described.

2. A mold for forming tubular bricks, having a hollow core or cores provided with an upper cutting-edge, and removable side or end pieces, substantially as and for the purpose described.

In testimony whereof I have hereunto set my hand.

ADAM HAHN.

Witnesses:
A. E. FINEGAN,
H. CLAY McKINLEY.